United States Patent [19]

Mussallem, III

[11] Patent Number: 4,985,279
[45] Date of Patent: Jan. 15, 1991

[54] PROCESS FOR PREPARING CARPET UNDERLAY

[75] Inventor: Charles S. Mussallem, III, Jacksonville, Fla.

[73] Assignee: No-Muv Corporation, Inc., Jacksonville, Fla.

[21] Appl. No.: 385,442

[22] Filed: Jul. 26, 1989

[51] Int. Cl.$^5$ .................................... B05D 5/00
[52] U.S. Cl. .................................... 427/209; 28/107; 28/169; 156/148; 427/358; 427/389.9; 428/95; 428/235; 428/300; 428/301
[58] Field of Search ............... 28/159, 158, 163, 167, 28/169, 107; 427/244, 389.9, 209, 358; 428/96, 95, 235, 300, 301; 156/148

[56] References Cited

U.S. PATENT DOCUMENTS

| | | | |
|---|---|---|---|
| 4,229,406 | 10/1980 | Pollock | 264/293 X |
| 4,504,537 | 3/1985 | Mussallen | 264/505 X |
| 4,504,538 | 3/1985 | Mussallem | 264/505 X |
| 4,668,559 | 5/1987 | Mussallem | 156/148 X |
| 4,725,476 | 2/1988 | Mussallem | 156/148 X |

Primary Examiner—Michael Lusignan
Attorney, Agent, or Firm—Arthur G. Yeager

[57] ABSTRACT

A process of carding several different types of fibers into webs, combining the webs by layering alternate types and needle punching the combined webs into a tightly felted sheet impregnating the sheet on both sides with a synthetic rubber latex and curing the latex in place by baking the impregnated sheet.

20 Claims, 1 Drawing Sheet

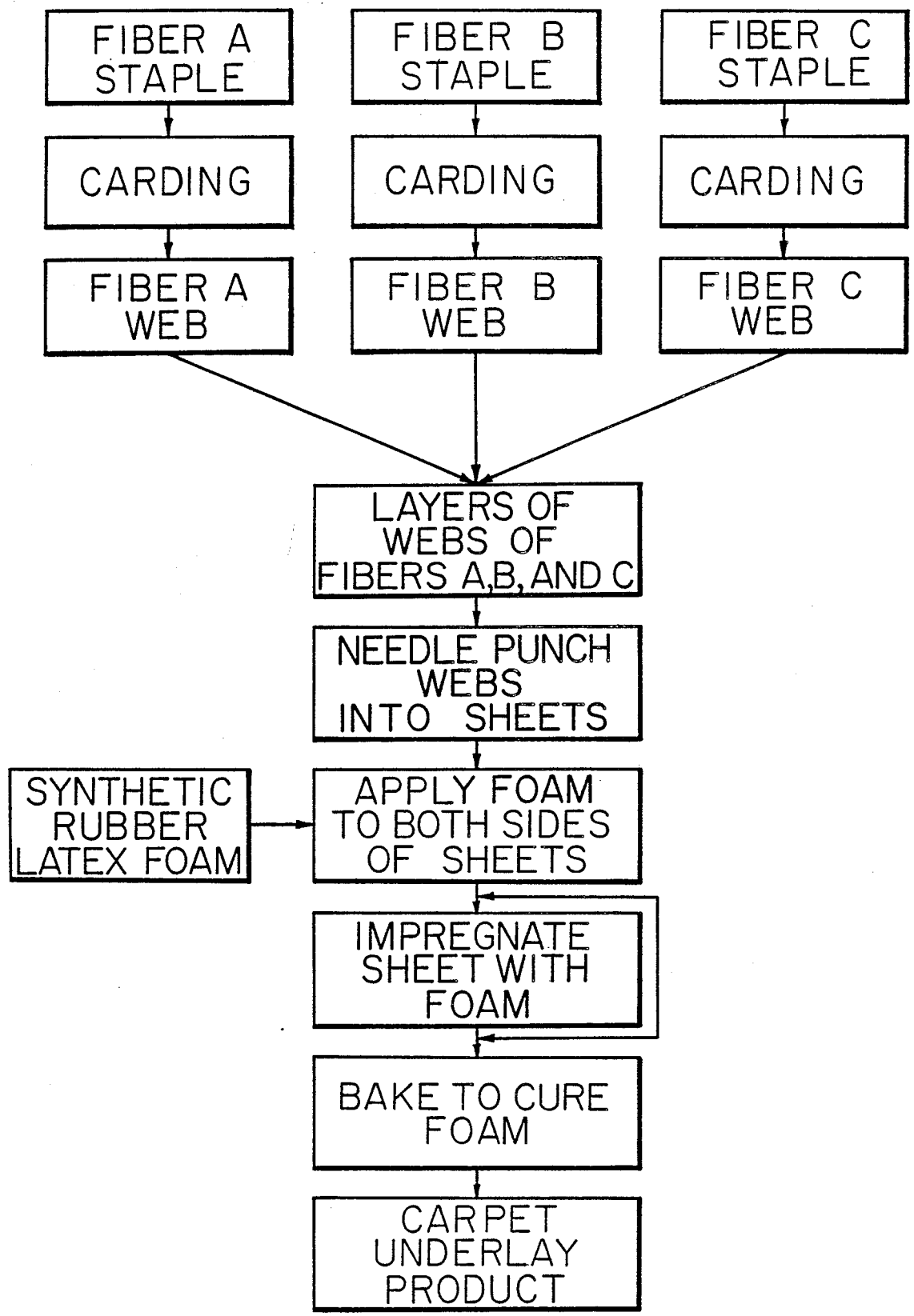

PROCESS FOR PREPARING CARPET UNDERLAY

BACKGROUND OF THE INVENTION

Wall-to-wall carpeting is usually installed with an underlay or padding to provide comfortable walking. It is somewhat difficult to install such carpeting over a normal underlay because of the need to stretch the carpeting toward the wall over an underlay that tends to cling to the carpeting. This causes uneveness in the underlay and the carpeting. Contrary to other carpet and underlay structures, in this instance it would be desirable for the face of the underlay which contacts the carpeting to be of low friction so the carpet can slide easily over the underlay during installation. Relative sliding after installation is not a problem since both the carpeting and the underlay are fixed around the entire perimeter.

The underlays described in my U.S. Pat. Nos. 4,504,537 and 4,504,538 have specific properties for specialized uses, e.g., the former relates to nonslip properties as between the underlay and the wood or tile floors underneath; and the latter is designed to lay on carpeting and to support a decorative rug above it. The underlays in my two U.S. Pat. Nos. 4,668,559 and 4,725,476 have upper surfaces of low friction characteristics so as to permit wall-to-wall carpeting to slide over the underlay and not bunch or wrinkle. In more recent developments it has become popular to attach the carpeting and the underlay to each other by a suitable adhesive to eliminate any wrinkling or bunching; and also to attach the underlay to wooden or tile flooring by a suitable adhesive. These requirements demand a new set of properties for the underlay which are supplied by this invention.

It is an object of this invention to provide a process for making a carpet underlay suitable for being adhesively attached to the flooring underneath and the carpeting above. It is another object of this invention to provide a suitably tough, resilient underlay that is a comfortable base for those walking on the carpet. Still other objects will become apparent from the more detailed description which follows.

BRIEF SUMMARY OF THE INVENTION

This invention relates to a process for preparing an improved carpet underlay which comprises the sequential steps of:
 (a) carding one or more mixtures of different types of fiber to produce a plurality of separate webs;
 (b) forming a composite web of alternate layers of said webs of the same or different mixtures of fibers;
 (c) needle punching said composite web into a final compact sheet of a desired thickness;
 (d) impregnating said final sheet from both sides with a rubber latex mixture;
 (e) baking said impregnated sheet; and
 (f) recovering a carpet underlay.

In one preferred embodiment of the invention, the composite web is made up of alternating layers of webs containing polypropylene fibers, nylon fibers, and polyester fibers. In another preferred embodiment the sheet is impregnated with a mixture of natural rubber latex and a synthetic rubber high solids latex and is baked at about 250° F. until the mixture is cured.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the accompanying drawing showing a generalized flow sheet for the process of the invention.

DETAILED DESCRIPTION OF THE INVENTION

This invention is directed to a process for preparing a carpet underlay that is particularly suited to function as a resilient pad under a carpet that can be glued both to the carpet and to the floor. It is a novel nonwoven composition of mixed fibers with a latex layer on both sides having excellent cushioning properties and overall consistency.

The process involves the use of mixtures of several different types of fibers, preferably at least three. The three preferred fibers are polypropylene, nylon, and polyester and mixtures of these are labeled Fiber A, Fiber B and Fiber C in the attached drawing. The mixture of Fibers in Fiber A may be the same or a different mixture than that of Fiber B or Fiber C, and similarly, the mixture of Fiber B and the mixture of Fiber C may be identical to each other, different from each other and the same as or different from that of Fiber A. These fibers may be from any source and may be of random length or staple fibers.

The separate mixtures of Fiber A, Fiber B and Fiber C are passed through a carding machine to align the fibers and lay them into separate webs of the respective mixtures of fibers.

The several types of webs (whether it be two, three or more than three webs) are then joined into a composite web by a layering operation in which webs of Fiber A, webs of Fiber B and webs of Fiber C are alternated or randomly assembled to prepare a stack of mixed webs. The stack of webs is then subjected to needle punching to produce a compact sheet of tightly packed fibers, the sheet having a thickness of about one-quarter to one-half inch total thickness as desired for the particular underlay being prepared. The layering step may be accomplished continuously by machine by having a separate manufacturing line for each mixture of fibers (e.g., Fiber A, Fiber B, and Fiber C) with automatic machine layering of alternate webs from each line. Of course, the layering may also be done by hand or a combination of the two so as to insert webs from other sources as available or to insert a reinforcing plastic lattice. The layering may also include a step of doubling a web back and forth upon itself to produce the desired number of layers. It is not critical to perform the layering in any one manner.

The above needle punching operation may be varied as desired for different applications. If a reinforcing layer is preferred (as is described in U.S. Pat. Nos. 2,504,537 and 2,504,538) a plastic lattice reinforcing layer is incorporated into the stack of mixed webs, preferably as a central layer and then the stack is needle punched into the final compact sheet. This provides an additional stiffness and strength but less cushioning in the final compact sheet.

The fibrous final compact sheet as described above coming from the needle punching operation is then impregnated with a synthetic rubber latex foam and baked to cure the latex in situ. There are different ways in which to impregnate the sheet. In one method, the latex is coated on the sheet as by pouring and spreading, spraying or the like, and then is worked into the sheet by scraping across the coated sheet with a sharp edged knife or rod or beam. The pressure applied to the scraper forces the latex into the interior regions of the sheet. Each side is treated in this way to complete the impregnation of the sheet. Another option is to use a roller instead of a sharp edged knife, rod, or beam. The roller is pressed against the coated side and rolled across the coated side. If a spray is sufficiently strong it, alone, may be sufficient to impregnate the two sides of the sheet without the necessity for any scraping or rolling action. Generally the impregnation results in the rubber latex penetrating about 0.01 inch to about 0.10 inch below each surface treated, preferably about 0.03 inch to about 0.06 inch.

Regardless of the manner in which the sheet is impregnated on both sides, the latex is then cured in situ by a baking operation of about 225° to 275° F. for a time of about fifteen to thirty minutes. Generally, the curing is done in a travelling oven at about 250° F. and with the underlay travelling at about thirty feet per minute. The resulting product is a carpet underlay which is firm and yet soft underfoot, and may be used in any of several ways, e.g., affixed to the floor in a wall-to-wall carpet assembly, loosely laid under a rug which is not affixed to the floor; or glued to the floor and/or to the overlying carpet. The latter option is a more recent option and is particularly suitable for the underlay of this invention.

The synthetic rubber latex may be any of several commercial types available on the market today. Generally these are materials such as butadiene-styrene or other olefin-diolefin copolymers, prepared in an aqueous latex form for use in coating or spraying objects of many designs and uses. Preferably, the rubber latex is a mixture of natural rubber latex and a high solids synthetic rubber latex, and is in the form of a thin liquid having a viscosity and particle size about the same as that of latex paints available on today's market.

The curing operation is accomplished by heating the impregnated material in a travelling oven or by other equivalent means. A temperature of about 225° to 275° F. at a time of about fifteen to thirty minutes is normally sufficient.

The addition of the rubber latex to the compact sheet serves to smooth out and hold all of the loose fiber ends adjacent the surfaces and to add to the tensile strength of the underlay, to give a unique bond to the sheet, to make the underlay, more resilient or shock absorbing, to help seal the porous nature of the sheet, and to restrict the penetration of the adhesives into the sheet which may tend to adversely effect its resiliency or other desirable physical properties.

Many glues can be used for attaching the underlay to the floor and for attaching the carpet to the underlay. Generally, the glue between the underlay and the carpet is releasable, i.e., the bond can be broken by a determined effort without special treatment. More permanent glues are generally used to bond the underlay to the floor. These glues may require special treatments to break the bond.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A process for preparing an improved carpet underlay which comprises the sequential steps of:
    (a) separately carding one or more mixtures of different types of fiber to produce a plurality of webs;
    (b) forming a composite web of alternate layers of said webs of the same or different mixtures of fibers;
    (c) needle punching said composite web into a final compact sheet of a desired thickness;
    (d) impregnating said final sheet from both sides with a rubber latex mixture;
    (e) baking said impregnated sheet to cure said latex in situ; and
    (f) recovering a carpet underlay.

2. The process of claim 1 wherein said mixtures include random lengths and staple fibers of at least two types of fibers from the group consisting of polypropylene fibers, nylon fibers, and polyester fibers.

3. The process of claim 1 wherein each said composite web includes at least one said web of each of said mixtures of different types of fiber.

4. The process of claim 1 wherein said final sheet of a desired thickness is from about one-quarter to about one-half inch in thickness.

5. The process of claim 1 wherein said rubber latex mixture is a mixture of natural rubber latex and a high solids synthetic rubber latex.

6. The process of claim 1 wherein said latex-impregnated sheet is baked at a temperature of about 225°–275° F. for about fifteen to thirty minutes.

7. The process of claim 6 wherein said temperature is about 250° F.

8. The process of claim 1 wherein step (d) is accomplished by coating both sides of said sheet with said latex mixture, followed by scraping both sides with a rigid straight edge knife blade.

9. The process of claim 1 wherein step (d) is accomplished by coating both sides of said sheet with said latex mixture followed by subjecting each coated side to the action of a roller pressing against that side.

10. The process of claim 1 wherein step (d) is accomplished by spraying said latex mixture into each side of said sheet.

11. The process of claim 1 wherein step (e) is accomplished by passing said carpet underlay from step (d) through an oven at a temperature of about 225°–275° F. at a rate of about thirty feet per minute.

12. The process of claim 1 wherein step (c) includes adding to said composite web before needle punching a layer of reinforcing polyester scrim.

13. A process for preparing an improved carpet underlay which comprises the sequential steps of:
    (a) separately carding a plurality of types of staple fibers to produce a plurality of webs;
    (b) forming a composite web of alternate layers of said webs;
    (c) needle punching said composite web to produce a compact sheet of a desired thickness;
    (d) impregnating said compact sheet from both planar and parallel surfaces with a rubber latex mixture to retain the loose fibers on said surfaces; and (e) baking said impregnated sheet to cure said latex in situ.

14. The process of claim 13 wherein said types of fibers include random lengths and staple fibers of polypropylene, nylon and polyester.

15. The process of claim 13 wherein said final compact sheet of a desired thickness is from about one-quarter to about one-half inch in thickness with the rubber latex mixture penetrating about 0.01–0.10 inches below each said surface.

16. The process of claim 13 wherein said rubber latex mixture is a mixture of natural rubber latex and a high solids synthetic rubber latex which penetrates said sheet about 0.01 inch to 0.10 inch below each said surface and is baked at a temperature of about 225°–275° F. for about 15–30 minutes.

17. The process of claim 13 wherein step (d) is accomplished by coating both sides of said sheet with said latex mixture, followed by scraping both sides with a rigid straight edge knife blade.

18. The process of claim 13 wherein step (d) is accomplished by coating both sides of said sheet with said latex mixture followed by subjecting each coated side to the action of a roller pressing against that side.

19. The process of claim 13 wherein step (d) is accomplished by spraying said latex mixture into each side of said sheet.

20. The process of claim 13 further comprising step (f) providing a layer of reinforcing polyester scrim between said alternate layers of said webs in step (b) before step (c).

* * * * *